(12) United States Patent
Asghari et al.

(10) Patent No.: US 12,099,144 B1
(45) Date of Patent: Sep. 24, 2024

(54) USE OF WAVEGUIDE ARRAYS IN LIDAR SYSTEMS

(71) Applicant: SiLC Technologies, Inc., Monrovia, CA (US)

(72) Inventors: Mehdi Asghari, La Canada Flintridge, CA (US); Vala Fathipour, Pasadena, CA (US); Shuren Hu, Arcadia, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 804 days.

(21) Appl. No.: 17/027,670

(22) Filed: Sep. 21, 2020

(51) Int. Cl.
| | |
|---|---|
| *G01S 7/481* | (2006.01) |
| *G01S 17/06* | (2006.01) |
| *G01S 17/58* | (2006.01) |
| *G02B 6/293* | (2006.01) |
| *G02B 6/35* | (2006.01) |

(52) U.S. Cl.
CPC ........... *G01S 7/4817* (2013.01); *G01S 7/4811* (2013.01); *G01S 17/06* (2013.01); *G01S 17/58* (2013.01); *G02B 6/29301* (2013.01); *G02B 6/3518* (2013.01)

(58) Field of Classification Search
CPC .................................................... G01S 7/4817
See application file for complete search history.

(56) References Cited

U.S. PATENT DOCUMENTS

| | | | | |
|---|---|---|---|---|
| 11,119,219 | B1 * | 9/2021 | LaChapelle | G01S 7/4863 |
| 11,493,753 | B1 * | 11/2022 | Wood | G02B 27/10 |
| 2018/0120436 | A1 * | 5/2018 | Smits | G01S 7/4817 |
| 2018/0359033 | A1 * | 12/2018 | Xu | G02B 6/4204 |
| 2018/0364336 | A1 * | 12/2018 | Hosseini | G01S 7/4814 |
| 2019/0018121 | A1 * | 1/2019 | Sayyah | H01L 23/544 |
| 2020/0166647 | A1 * | 5/2020 | Crouch | G01S 17/32 |
| 2022/0065999 | A1 * | 3/2022 | Phare | G01S 7/4815 |

* cited by examiner

*Primary Examiner* — Yuqing Xiao
*Assistant Examiner* — Zhengqing Qi
(74) *Attorney, Agent, or Firm* — Gavrilovich, Dodd & Lindsey LLP

(57) ABSTRACT

A LIDAR system includes a LIDAR chip configured to output a LIDAR output signal. The LIDAR chip includes a waveguide array. A steering mechanism is configured to control a direction that a system output signal travels away from the LIDAR system. The system output signal includes light from the LIDAR output signal. A location that a comparative signal is incident on the waveguide array changes in response to the steering mechanism changing a direction that the system output signal travels away from the LIDAR system. The comparative signal includes light from the system output signal after the system output signal has been reflected by an object located outside of the LIDAR system.

18 Claims, 10 Drawing Sheets

US 12,099,144 B1

USE OF WAVEGUIDE ARRAYS IN LIDAR SYSTEMS

FIELD

The invention relates to optical devices. In particular, the invention relates to LIDAR systems.

BACKGROUND

LIDAR system output a system output signal. Objects in the path of the system output signal reflect the system output signal. A portion of the reflected light returns to the LIDAR system as a system return signal. The LIDAR system processes the system return signal to generate LIDAR data that indicates a radial velocity and/or distance between the objects and the LIDAR system.

LIDAR systems can be classified as coaxial (sometimes called monostatic) or biaxial (sometimes called bistatic). In a coaxial LIDAR system, the path that the light travels after being output from the LIDAR system is also traveled by the reflected light returning to the LIDAR system. However, in biaxial systems, the path that the light travels after being output from the LIDAR system is different from the path traveled by the reflected light returning to the LIDAR system.

There are a variety of circumstances where biaxial systems are preferable to coaxial systems. For instance, biaxial systems can often have reduced levels of loss in returned light levels. However, LIDAR systems typically include a steering mechanism that steers the system output signal to different sample regions in a field of view. In biaxial systems, this change in the direction of the system output signal changes the angle between the returning light and the LIDAR system. This angle change can reduce the collection efficiency for the light returning to the LIDAR system. As a result, there is a need for an improved LIDAR system.

SUMMARY

A LIDAR system includes a LIDAR chip configured to output a LIDAR output signal. The LIDAR chip includes a waveguide array. A steering mechanism is configured to control a direction that a system output signal travels away from the LIDAR system. The system output signal includes light from the LIDAR output signal. A location that a comparative signal is incident on the waveguide array changes in response to the steering mechanism changing a direction that the system output signal travels away from the LIDAR system. The comparative signal includes light from the system output signal after the system output signal has been reflected by an object located outside of the LIDAR system.

A LIDAR system includes a LIDAR chip having a free space region with a facet through which a LIDAR input signal enters the LIDAR chip from off the LIDAR chip. The LIDAR chip includes an optical component that receives a comparative light signal directly from the free space region. The comparative light signal includes, consists of, or consists essentially of light from the LIDAR input signal.

A LIDAR system includes a LIDAR chip configured to generate a composite signal. The composite signal has a contribution from a comparative signal and a reference signal. The comparative signal includes light reflected by an object located outside of the LIDAR system. The reference signal includes light that has not exited from the LIAR chip. The LIDAR chip also includes a free space region through which the comparative signal and the reference signal travel.

BRIEF DESCRIPTION OF THE FIGURES

FIG. 2A a topview of portion of a LIDAR chip having an interface between a free space region, a redirection component, and reference waveguide.

FIG. 2B is a cross section of the LIDAR chip shown in FIG. 2A taken along the line labeled B in FIG. 2A.

FIG. 2C is a cross section of the LIDAR chip shown in FIG. 2A taken along the line labeled C in FIG. 2A.

FIG. 2D is a cross section of the LIDAR chip shown in FIG. 2A taken along the line labeled D in FIG. 2A.

FIG. 2E is another embodiment of a cross section of the LIDAR chip shown in FIG. 2A taken along the line labeled D in FIG. 2A.

FIG. 2F is a cross section of a free space region that terminates at a facet located at a lateral side of a LIDAR chip.

FIG. 2G is an interface between a beam divider and multiple free space regions.

FIG. 2H is a topview of an interface between an entry side of a waveguide array and a free space region.

DESCRIPTION

A LIDAR system outputs a system output signal. Objects in the path of the system output signal reflect all or a portion of the system output signal. A portion of the reflected light returns to the LIDAR system as a system return signal. The LIDAR system includes a LIDAR chip that receives a LIDAR input signal that includes light from the system return signal. The LIDAR system includes electronics that process light from the LIDAR input signal so as to generate the LIDAR data (radial velocity and/or distance between a reflecting object and the LIDAR system).

The LIDAR chip includes a free space region with a facet through which the LIDAR input signal enters the LIDAR chip. In some instances, the LIDAR system is constructed such that the angle that the LIDAR input signal is incident upon the facet of the free space region changes in response to steering of the LIDAR output signal. However, because the LIDAR input signal is incident upon a facet of a free space region, the coupling loss that occurs as result of changes to this angle of incidence are reduced relative to prior LIDAR chip configurations.

Figure 1A:
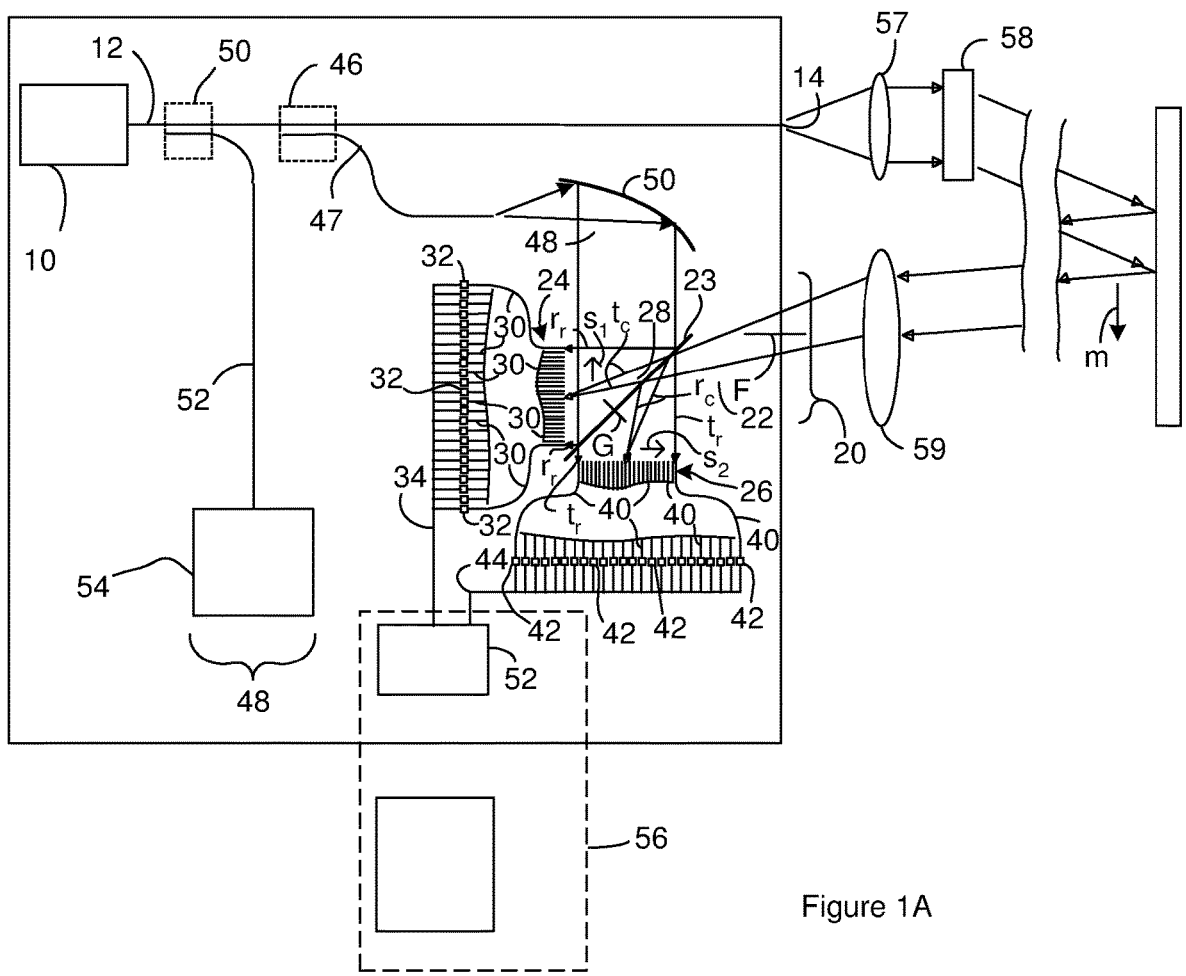
FIG. 1A is a topview of a biaxial LIDAR system.

FIG. 1A is a topview of a schematic of a LIDAR system. The LIDAR system includes a LIDAR chip with a light source 10 that outputs an outgoing LIDAR signal. A suitable light source 10 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip also includes a utility waveguide 12 that receives the outgoing LIDAR signal from the light source 10. The utility waveguide 12 terminates at an output component 14 and carries the outgoing LIDAR signal to the output component 14. The output component 14 can be positioned such that the outgoing LIDAR signal traveling through the output component 14 exits the chip and serves as a LIDAR output signal. For instance, the output component 14 can be positioned at an edge of the chip so the outgoing LIDAR signal traveling through the output component 14 exits the chip and serves as a LIDAR output signal.

Light from the LIDAR output signal travels away from the LIDAR system and may be reflected by objects in the path of the LIDAR output signal. When the LIDAR output signal is reflected, at least a portion of the reflected light travels returns to the LIDAR chip as a LIDAR input signal. Light from the LIDAR input signal enters the LIDAR chip through a facet 20 of a free space region 22. In some instances, the facet 20 of a free space region 22 is flat.

The portion of the LIDAR input signal that enters the free space region 22 can serve as a comparative light signal that includes or consists of light from the LIDAR input signal. The comparative light signal can travel through the free space region 22 to an optical component that operates on the comparative light signal. For instance, the comparative light signal can travel through the free space region 22 to a beam divider 23 that receives the comparative light signal. A beam divider 23 can direct a first portion of the comparative light signal toward a first waveguide array 24 and a second portion of the comparative light signal toward a second waveguide array 26. As a result, the first waveguide array 24 can receive light from the comparative light signal and the second waveguide array 26 can receive light from the comparative light signal.

In FIG. 1A, the first portion of the comparative light signal is labeled $t_c$ and the second portion of the comparative light signal is labeled $r_c$. The first portion of the comparative light signal can travel from the beam divider 23 to the first waveguide array 24 through a second free space region 28. The second portion of the comparative light signal can travel from the beam divider 23 to the second waveguide array 26 through the free space region 22. In some instances, the beam divider 23 is positioned between the free space region 22 and the second free space region 28. Suitable beam dividers include, but are not limited to plate beamsplitters.

The first waveguide array 24 has multiple first array waveguides 30 that each terminates at the second free space region 28. In order to simplify the illustration, the full length of only two first array waveguides 30 is shown in the first waveguide array of FIG. 1A. Each of the first array waveguides has an entry port located at the interface between the second free space region 28 and the first array waveguides 30. All or a portion of the first portion of the comparative light signal can enter a first array waveguide 30 through the entry port for that first array waveguide 30. The first waveguide array illustrated in FIG. 1A has 24 first array waveguides 30, although other numbers of first array waveguides 30 are possible. A suitable number of first array waveguides 30 includes, but is not limited to, greater than or equal to 2, 10, or 20 and/or less than 100, 500, or 1000.

The first array waveguides 30 are configured such that one or more of the first array waveguides 30 receives at least a portion of the first portion of the comparative light signal. Accordingly, at least a portion of the first portion of the comparative light signal enter one or more of the first array waveguides 30 through the associated entry port(s). The portion of the first portion of the comparative light signal that enters a first array waveguide 30 serves as a first comparative portion. Each of the first array waveguides 30 is configured to carry a first comparative portion to a first light sensor 32 configured to convert the optical first comparative portion to an electrical signal that is output from the first light sensor 32 as a sensor output signal. Suitable first light sensors 32 include, but are not limited to, Ge photodetectors, and InP photodetectors.

The first light sensors 32 are connected in parallel. One of the parallel connections is evident in FIG. 1A. For instance, a first parallel line 34 provides one of the parallel connections between the first light sensors 32. Accordingly, the sensor output signals from the first light sensors 32 are added or combined to form a composite signal carried on the first parallel line 34. The first parallel line 34 carries a composite signal. Since the sensor output signals include a contribution from one or more first comparative portions, the composite signal includes a contribution from one or more of the first comparative portions. Accordingly, the composite signal includes a contribution from one or more of the first comparative portions and accordingly from the comparative signal.

The second waveguide array 26 has multiple second array waveguides 40 that each terminates at the free space region 22. In order to simplify the illustration, the full length of only two second array waveguides 40 is shown in the second waveguide array of FIG. 1A. Each of the second array waveguides 40 has an entry port at the interface between the free space region 22 and the second array waveguides 40. All or a portion of the second portion of the comparative light signal can enter a first array waveguide 30 through the entry port for that first array waveguide 30. The second waveguide array 26 illustrated in FIG. 1A has 24 second array waveguides 40, although other numbers of second array waveguides 40 are possible. A suitable number of second array waveguides 40 includes, but is not limited to, greater than or equal to 2, 10, or 20 and/or less than 100, 500, or 1000.

The second array waveguides 40 are configured such that one or more of the second array waveguides 40 receives at least a portion of the second portion of the comparative light signal. The portion of the second portion of the comparative light signal that is received by a second array waveguide 40 serves as a second comparative portion. Each of the second array waveguides 40 is configured to carry a second comparative portion to a second light sensor 42 configured to convert the optical second comparative portion to an electrical signal that is output from the second light sensor 42 as a sensor output signal. Suitable second light sensors 42 include, but are not limited to, Ge photodetectors and InP photodetectors.

The second light sensors 42 are connected in parallel. One of the parallel connections is evident in FIG. 1A. For instance, a second array parallel line 44 provides one of the parallel connections between the second light sensors 42. Accordingly, the sensor output signals from the second light sensors 42 are added or combined to form a second composite signal carried on the second array parallel line 44. Since the sensor output signals include a contribution from one or more second comparative portions, the second composite signal includes a contribution from one or more of the second comparative portions. As a result, the second composite signal includes a contribution from one or more of the second comparative portions and accordingly from the comparative signal.

The LIDAR chip includes a splitter 46 that moves a portion of the outgoing LIDAR signal from the utility waveguide 12 onto a reference waveguide 47 as a reference signal. Suitable splitters 46 include, but are not limited to, optical couplers, y-junctions, and multimode interference devices (MMIs).

The reference waveguide 47 carries the reference light signal to third free space region 48. In some instances, the third free space region 48 is continuous with the second free space region 28 and/or can be the same as the second free space region 28. The reference light signal can travel through the third free space region 48 to a redirection component 50. The redirection component 50 redirects the reference signal toward the optical component that receives the comparative signal from the free space region. In some instances, the redirection component 50 is configured to collimate the reference signal as the reference signal travels toward the optical component. In FIG. 1A, the redirection component 50 redirects the reference signal toward the beam divider 23. The reference signal can travel to the beam divider 23 through the third free space region 48 and/or the second free space region 28. FIG. 1A illustrates the redirection component 50 collimating the reference signal as the reference signal travels toward the beam divider 23.

The beam divider 23 receives the reference signal. The beam divider 23 directs a first portion of the reference signal toward the first waveguide array 24 and a second portion of the reference signal toward the second waveguide array 26. In FIG. 1A, the first portion of the reference signal is labeled $r_r$ and the second portion of the reference signal is labeled $t_r$. The first portion of the comparative light signal can travel from the beam divider 23 to the first waveguide array 24 through the second free space region 28. The second portion of the comparative light signal can travel from the beam divider 23 to the second waveguide array 26 through the free space region 22.

One or more of the first array waveguides 30 receives at least a portion of the first portion of the reference signal. The portion of the first portion of the reference signal that is received by a first array waveguide 30 serves as a first reference portion. Each of the first array waveguides 30 is configured to carry the received first reference portion to one of the first light sensors 32. As noted above, the sensor output signals from the first light sensors 32 are added or combined on the first parallel line 34. Since the sensor output signals include a contribution from one or more first reference portions, the composite signal includes a contribution from one or more of the first reference portions and accordingly from the reference signal. Accordingly, the composite signal can include a contribution from the first comparative portions and also from one or more of the first reference portions. As a result, the composite signal can include a contribution from the comparative light signal and from the reference signal. The composite signal is beating at a beat frequency due to the difference in the frequencies of the contributions of the comparative light signal and the reference signal to the composite light signal.

One or more of the second array waveguides 40 receives at least a portion of the second portion of the reference signal. The portion of the second portion of the reference signal that is received by a second array waveguide 40 serves as a second reference portion. Each of the second array waveguides 40 is configured to carry the received second reference portion to one of the second light sensors 42. As noted above, the sensor output signals from the second light sensors 42 are added or combined on the second array parallel line 44. Since the sensor output signals include a contribution from one or more second reference portions, the second composite signal includes a contribution from one or more of the second reference portions. Accordingly, the second composite signal can include a contribution from one or more of the second comparative portions and also from one or more of the second reference portions. As a result, the second composite signal can include a contribution from the comparative light signal and also from the reference signal. The second composite signal is beating at a beat frequency due to the difference in the frequencies of the contributions of the comparative light signal and the reference signal to the second composite light signal.

As is evident from the depiction of the reference signal and the comparative signal in FIG. 1A, different first array waveguides 30 can receive different distributions of the reference signal and the comparative signal. For instance, a portion of the first array waveguides 30 can receive only light from the reference signal and a portion of the first array waveguides 30 can receive light from the reference signal and light from the comparative signal. In some instances, a portion of the first array waveguides 30 do not receive light from the comparative signal. In some instances, a portion of the first array waveguides 30 do not receive light from the comparative signal and each of the first array waveguides 30 receives light from the reference signal. Different second array waveguides 40 can receive different distributions of the reference signal and the comparative signal. For instance, a portion of the second array waveguides 40 can receive only light from the reference signal and a portion of the second array waveguides 40 can receive light from the reference signal and light from the comparative signal. In some instances, a portion of the second array waveguides 40 do not receive light from the comparative signal. In some instances, a portion of second array waveguides 40 do not receive light from the comparative signal and each of the second array waveguides 40 receives light from the reference signal. As will be discussed below, the distribution of the comparative signal across the first array waveguides 30 can change in response to steering of the system output signal and the distribution of the comparative signal across the second array waveguides 40 can change in response to steering of the system output signal.

The beam divider 23 can be constructed such that the contribution of the reference signal to the second composite signal is phase shifted by 180° relative to the contribution of the reference signal to the composite signal while the contribution of the comparative signal to the second composite signal is in-phase with the contribution of the comparative signal to the composite signal.

The first composite signal and the second composite signal are received at a processing unit 52. In particular, the first parallel line 34 carries the first composite signal to the processing unit 52 and the second array parallel line 44 carries the first composite signal to the processing unit 52.

A LIDAR system can optionally include components in addition to the LIDAR chip. For instance, the LIDAR system can include one or more signal-shaping components that shape the signals output from the LIDAR system and/or one or more steering mechanisms that can be used to steer a system output signal from to different sample regions in the field of view. For instance, the LIDAR system of FIG. 1A includes a first signal-shaping component 57 that receives the LIDAR output signal and outputs a shaped output signal. A steering-mechanism 58 receives the shaped output signal and outputs the system output signal. The steering-mechanism can steer the system output signal to the desired sample region in the field of view. When the system output signal is reflected by an object, the reflect light can serve as a system return signal. The LIDAR system also includes a second signal-shaping component 59 that receives the system signal and outputs the LIDAR input signal that is received by the LIDAR chip.

In FIG. 1A, the first signal-shaping component 57 is a lens configured to collimate the shaped output signal and the second signal-shaping component 59 is a lens configured to focus the LIDAR input signal. In some instances, the second signal-shaping component 59 is configured to focus the LIDAR input signal such that the resulting comparative signal is focused at or near a location along the entry side of the first waveguide array 24 and/or such that the resulting comparative signal is focused at or near a location along the entry side of the second waveguide array 26. For instance, the second signal-shaping component can be configured to focus the LIDAR input signal such that the resulting comparative signal is focused at or near a line through the entry ports arranged along the entry side of the first waveguide array 24 and/or such that the resulting comparative signal is focused at or near a line through the entry ports arranged along the entry side of the second waveguide array 26. In an example, the second signal-shaping component focuses the LIDAR input signal within 1, 2, or 3 μm of a line through the entry ports arranged along the entry side of the first waveguide array 24 and/or such that the resulting comparative signal is focused within 1, 2, or 3 μm of a line through the entry ports arranged along the entry side of the second waveguide array 26.

When the first signal-shaping component 57 and the second signal-shaping component 59 are each a lens, the lens serving as the second signal-shaping component 59 can have a wider aperture than the lens serving as the first signal-shaping component 57. The increased aperture of the lens serving as the second signal-shaping component 59 can improve light collection efficiency. In some instances, the improvement in light collection efficiency is desirable to overcome optical loss that result from the offset between the output component 14 and the facet 20 of the free space region. A suitable ratio for the aperture of the lens serving as the second signal-shaping component 59: the aperture of the lens serving as the first signal-shaping component 57 includes apertures greater than 1:1, 2:1, or 3:1 and/or less than 5:1, 10:1, or 20:1.

In some instances, components such as signal-shaping components and steering mechanisms can be mounted on and/or integrated with the LIDAR chip. In instances, when the LIDAR system excludes components in addition to the LIDAR chip, the signal output from the LIDAR chip can serve as the system output signal. For instance, when a LIDAR system includes a LIDAR chip constructed according to FIG. 1A and excludes components in addition to the LICAR chip, the LIDAR output signal can serve as the system output signal.

When the LIDAR system includes a steering component, the LIDAR system can include electronics that control the one or more steering component so as to steer the system output signal to different sample regions in the field of view. The angle of incidence of the LIDAR input signal on the facet 20 of the free space region 22 and/or can change the location where the LIDAR input signal is incident on the facet 20 of the free space region 22 can change in response to the steering of the system output signal. Since the facet 20 of the free space region 22 can be wider than the facet of a waveguide such as a ridge waveguide or a channel waveguide, the change in incident location and/or in incident angle is not a source of substantial optical loss. In some instances, the LIDAR system is constructed to have any one, two or three conditions selected from the group consisting of: the location where the LIDAR input signal is incident on the facet 20 of the free space region 22 changes in response to steering of the system output signal by more than 1°, 5°, or 10° and/or less than 20°, 60°, or 80° during operation of the LIDAR system; the angle of incidence of the LIDAR input signal on the facet 20 of the free space region 22 changes in response to steering of the system output signal by more than 1°, 2°, or 3° and/or less than 20°, 60°, or 80°; and a width of the facet 20 of the free space region 22 is more than 1 mm, 2 mm, or 5 mm and/or less than 10 mm, 20 mm, or 50 mm. In some instances, the free space region 22 is constructed such that the comparative signal travels at least 5 mm, 10 mm, or 20 mm between the facet 20 and the beam divider 23 or other optical component that receives the comparative signal from the free space region 22.

Additionally, the location where a waveguide array receives light from the comparative signal can change in response to the steering of the system output signal. However, the change in a location where the comparative signal enters the waveguide array does not result in substantial loss of the comparative signal because it merely changes the one or more array waveguides that receive the comparative signal. For instance, when a LIDAR chip is constructed according to FIG. 1A, the first portion of the comparative signal can move in the direction labeled $s_1$ in response to steering of the system output signal in the direction labeled m. The movement of the first portion of the comparative signal changes the one or more first array waveguides 30 that receive the first portion of the comparative signal. Since the composite signal can include a contribution from light received at each of the first array waveguides 30, changing the first array waveguide(s) 30 that receive the first portion of the comparative signal does not result in substantial loss for the first portion of the comparative signal.

As another example, when a LIDAR chip is constructed according to FIG. 1A, the second portion of the comparative signal can move in the direction labeled $s_2$ in response to steering of the system output signal in the direction labeled m. The movement of the second portion of the comparative signal changes the one or more second array waveguides 40 that receive the second portion of the comparative signal. Since the composite signal can include a contribution from light received at each of the second array waveguides 40, changing the second array waveguide(s) 40 that receive the second portion of the comparative signal does not result in substantial loss for the first portion of the comparative signal.

Figure 1B:
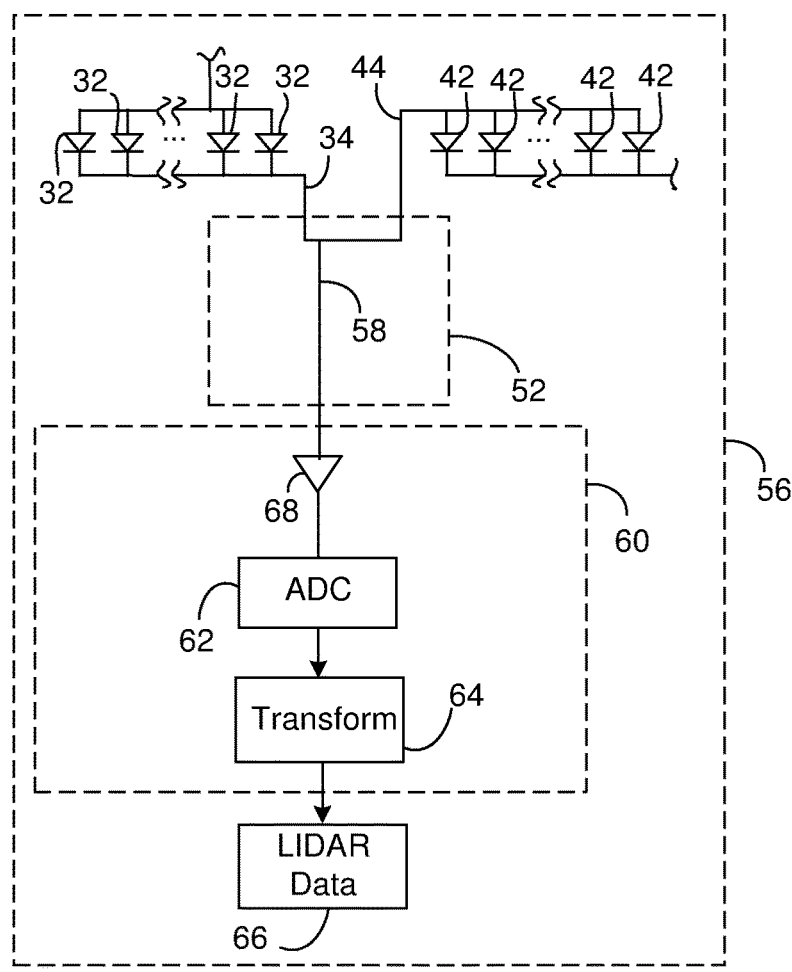
FIG. 1B is a schematic of electronics that are suitable for use with the LIDAR system of FIG. 1A.

The processing unit 52 can be included in the electronics 56. The electronics 56 can connect the first light sensors 32 and the second light sensors 42 as a balanced detector. For instance, the electronics can connect the first light sensors 32 in series with the second light sensor as illustrated in FIG. 1B. The serial connection between the first light sensors 32 and the second light sensors 42 carries the output from the balanced detector as a data signal. The data signal can be carried on a sensor output line 54 and can serve as an electrical representation of the composite signals.

The electronics 56 include a transform mechanism 60 configured to perform a mathematical transform on the data signal. The transform mechanism 60 includes an Analog-to-Digital Converter (ADC) 62 that receives the data signal from the sensor output line 54. The first Analog-to-Digital Converter (ADC) 62 converts the data signal from an analog form to a digital form and outputs a digital data signal. The digital data signal is a digital representation of the data signal.

The transform mechanism 60 includes a mathematical operation component 64 configured to receive the digital data signal. The mathematical operation component 64 is configured to perform the mathematical operation on the received digital data signal. Examples of suitable mathematical operations include, but are not limited to, mathematical transforms such as Fourier transforms. In one example, the mathematical operation component 64 performs a Fourier transform on the digital signal so as to convert from the time domain to the frequency domain. The mathematical transform can be a real transform such as a real Fast Fourier Transform (FFT). A real Fast Fourier Transform (FFT) can provide an output that indicates magnitude as a function of frequency. As a result, a peak in the output of the Fast Fourier Transform can occur at and/or indicate the correct solution for the beat frequency. The mathematical operation component 64 can execute the attributed functions using firmware, hardware or software or a combination thereof.

Figure 1C:
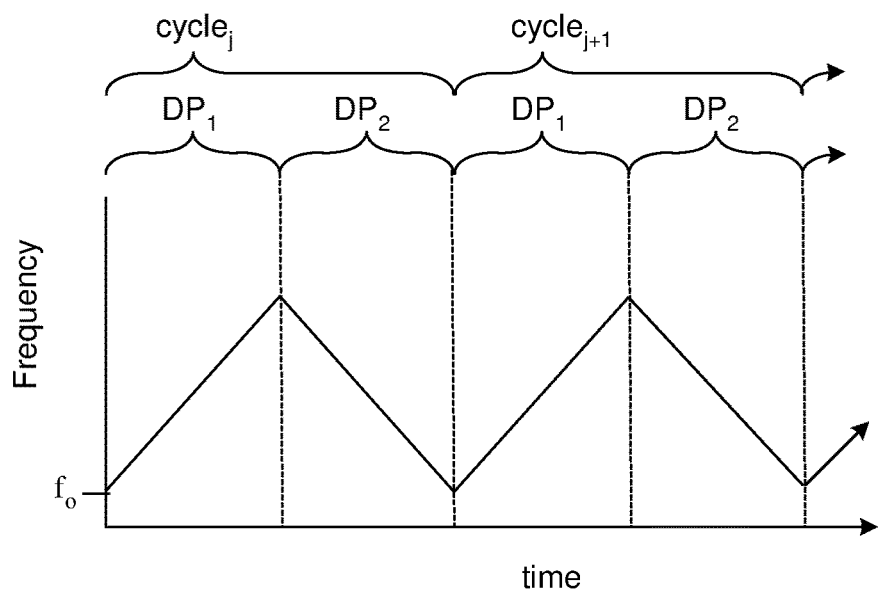
FIG. 1C shows the frequency versus time pattern for a system output signal and/or a LIDAR output signal.

The electronics include a LIDAR data generator 66 that receives the output from the mathematical operation component 64. The LIDAR data generator 66 can perform a peak find on the output of the transform component 64 to identify the peak in the frequency of the output of the transform component 64. The LIDAR data generator 66 treats the frequency at the identified peak as the beat frequency of the beating signals that each results from all or a portion of a comparative signal beating against all or a portion of a reference signal. The LIDAR data generator 66 can use the identified beat frequencies in combination with the frequency pattern of the LIDAR output signal and/or the system output signal to generate the LIDAR data. FIG. 1C has a solid line that shows an example of a suitable frequency pattern for the LIDAR output signal and the system output signal. Accordingly, the solid line also represents the frequency pattern for the reference signal.

FIG. 1C shows the frequency versus time pattern over a sequence of two cycles labeled $cycle_j$ and $cycle_{j+1}$. In some instances, the frequency versus time pattern is repeated in each cycle as shown in FIG. 1C. The illustrated cycles do not include re-location periods and/or re-location periods are not located between cycles. As a result, FIG. 1C illustrates the results for a continuous scan.

Each cycle includes K data periods that are each associated with a period index k and are labeled $DP_k$. In the example of FIG. 1C, each cycle includes two data periods (with k=1 and 2). In some instances, the frequency versus time pattern is the same for the data periods that correspond to each other in different cycles as is shown in FIG. 1C. Corresponding data periods are data periods with the same period index. As a result, each data period $DP_1$ can be considered corresponding data periods for that same channel index (i) and the associated frequency versus time patterns are the same in FIG. 1C. At the end of a cycle, the electronics return the frequency to the same frequency level at which it started the previous cycle.

During each data period, the frequency of the system output signal is varied at a constant rate. The rate can be zero but at least a portion of the data periods in each cycle have the system output signal varied at a non-zero rate. The direction and/or rate of the frequency change changes at the change of data periods from the same cycle. For instance, during the data period $DP_1$ and the data period $DP_2$, the electronics operate the light source such that the frequency of the system output signal changes at a linear rate ∝. The direction of the frequency change during the data period $DP_1$ is the opposite of the direction of the frequency change during the data period $DP_2$.

The beat frequencies ($f_{LDP}$) from two or more different data periods in the same cycle can be combined to generate the LIDAR data. For instance, the beat frequency determined from $DP_1$ in FIG. 1C can be combined with the beat frequency determined from $DP_2$ in FIG. 1C to determine the LIDAR data for a sample region. As an example, the following equation applies during a data period where electronics increase the frequency of the outgoing LIDAR signal during the data period such as occurs in data period $DP_1$ of FIG. 1C: $f_{ub}=-f_d+\alpha\tau$ where $f_{ub}$ is the beat frequency determined from the output of the mathematical operation component 64, $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 1C: $f_{db}=-f_d-\alpha\tau$ where fab is the beat frequency determined from the output of the mathematical operation component 64. In these two equations, $f_d$ and $\tau$ are unknowns. The electronics solve these two equations for the two unknowns. The radial velocity for the sample region then be determined from the Doppler shift ($v=c*f_d/(2f_c)$) and/or the separation distance for that sample region can be determined from $c*f_d/2$. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

All or a portion of the free space regions selected from the group consisting of the free space region 22, the second free space region 28, and the third free space region 48 can constrain the light signal in one direction. For instance, the selected free space region(s) can vertically constrain light signals. In these instances, the light signal can spread in the lateral directions and/or become more focused in the lateral directions. As a result, all or a portion of the free space regions selected from the group consisting of the free space region 22, the second free space region 28, and the third free space region 48 can be slab waveguides.

As shown in FIG. 1C, the lines sensor output line 54 that carries the data signals can optionally include an amplifier 68. Suitable amplifiers 68 include, but are not limited to, transimpedance amplifiers (TIAs).

Figure 2A:
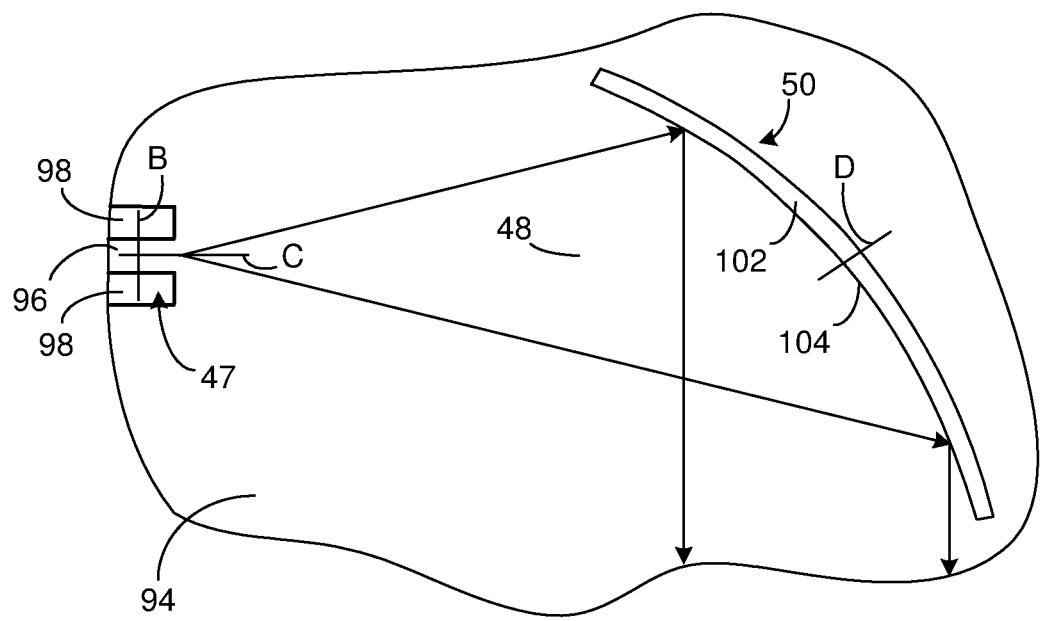
FIG. 2A through FIG. 2H illustrate one possible example of components that are suitable for use with the LIDAR system of FIG. 1A and/or FIG. 1B.
Figure 2B:
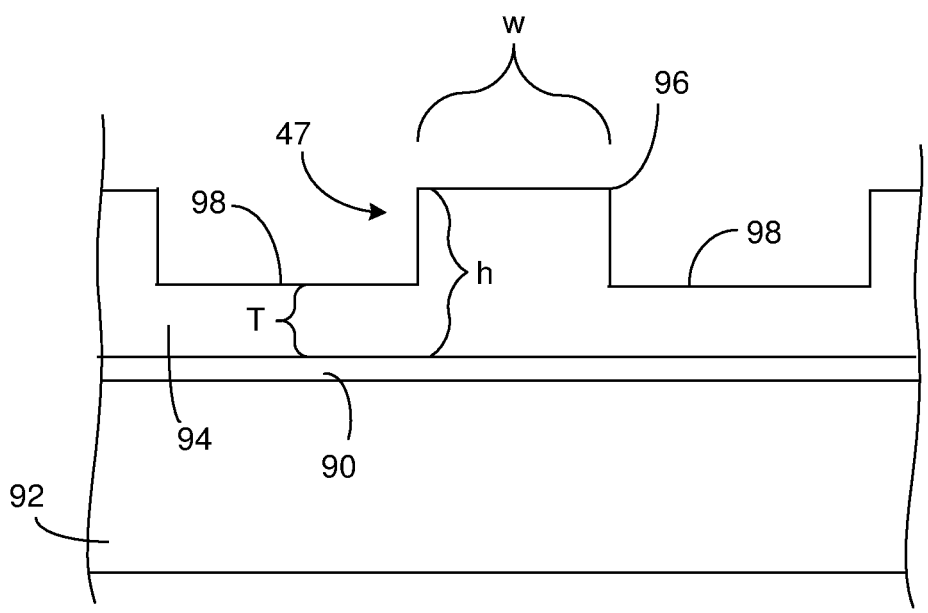
Figure 2C:
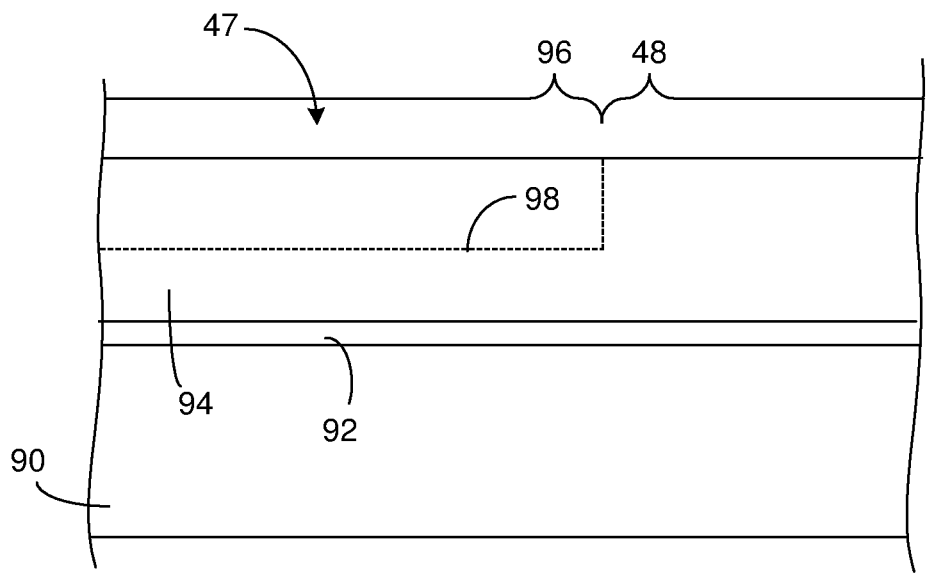
Figure 2D:
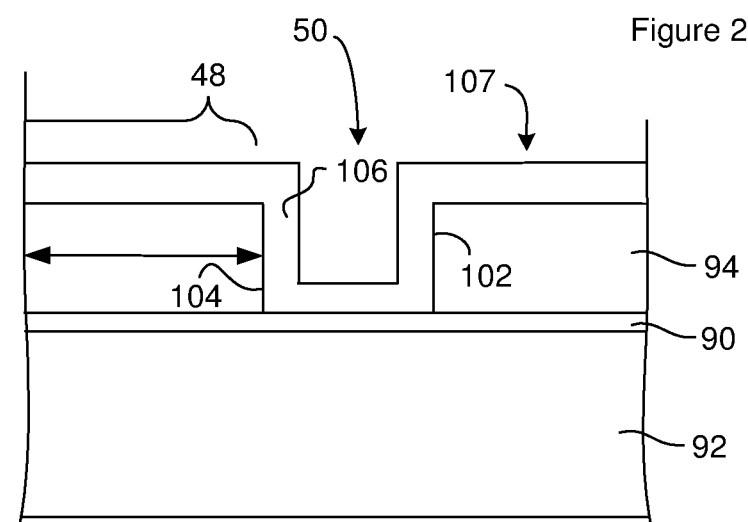

FIG. 2A through FIG. 2H illustrate an example of a suitable constructions for free space regions and other components that are suitable for use with a LIDAR system constructed as shown in FIG. 1A. FIG. 2A is a topview of the interface between the third free space region 48, the redirection component 50, and the reference waveguide 47. FIG. 2B is a cross section of the reference waveguide 47 taken along the line labeled B in FIG. 2B. FIG. 2C is a cross section of the interface between the reference waveguide and the third free space region 48 taken along the line labeled C in FIG. 2B. FIG. 2D is a cross section of the third free space region 48 taken along the line labeled D in FIG. 2B.

Suitable platforms for the LIDAR chip include, but are not limited to, silica, indium phosphide, and silicon-on-insulator wafers. FIG. 2A through FIG. 2H illustrate different portions of the LIDAR chip constructed on a silicon-on-insulator platform. A silicon-on-insulator (SOI) wafer includes a buried layer 90 between a substrate 92 and a light-transmitting medium 94. In a silicon-on-insulator wafer, the buried layer 90 is silica while the substrate and the light-transmitting medium 94 are silicon. The substrate of an optical platform such as an SOI wafer can serve as the base for the LIDAR chip. For instance, the optical components shown in FIG. 1A and/or FIG. 1B can be positioned on or over the top and/or lateral sides of the same substrate.

The portion of the LIDAR chip illustrated in FIG. 2A through FIG. 2H uses a waveguide construction that is suitable for use with chips constructed from silicon-on-insulator wafers. A ridge 96 of the light-transmitting medium 94 extends away from slab regions 98 of the light-transmitting medium 94. In FIG. 2C, one of the slab regions 98 are illustrated by the dashed lines and is located behind the illustrated ridge 96. The light signals are constrained between the top of the ridge and the buried layer 90. As a result, the ridge 96 at least partially defines the waveguide.

The dimensions of the ridge waveguide are labeled in FIG. 2B. For instance, the ridge has a width labeled w and a height labeled h. A thickness of the slab regions is labeled T. For LIDAR applications, these dimensions can be more important than other applications because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. Although the waveguide construction of FIG. 2B is disclosed in the context of the reference waveguide 47, the illustrated waveguide construction is suitable for any, all or a portion of the waveguides on a LIDAR chip constructed according to FIG. 1A.

The reference signal travels through the third free space region 48 between the reference waveguide 47 and the redirection component 50 and/or between the redirection component 50 and the beam divider 23 (not shown in FIG. 2A). The third free space region 48 can be free space in the horizontal direction but guided in the vertical direction. As a result, the reference signal can contract or expand horizontally when traveling through the third free space region 48.

The illustrated redirection component 50 includes a recess 102 (FIG. 2D) that extends partially or fully through the light-transmitting medium 94. Although the illustrated recess 102 does not extend into the buried layer 90, the illustrated recess 102 can extend into or through the buried layer 90. A surface of the recess 102 serves as a return surface 104. The return surface 104 is configured such that at least a portion of the reference signal that is incident on the return surface 104 from the light-transmitting medium 94 returns to the light-transmitting medium 94. The mechanism by which the return occurs can be reflection at the return surface 104 and/or by the return surface 104. For instance, a recess medium 106 can be positioned in the recess 102 and in contact with the return surface 104. The recess medium 106 can fill the recess 102 or be a layer of material that contacts the return surface 104. The recess medium 106 can be a fluid or a solid. As shown in FIG. 2D, the recess medium 106 can be a solid that also serves as a cladding 107 for the output component. In some instances, the recess medium 106 has a lower index of refraction than the light-transmitting medium 94 to cause reflection at the return surface 104. Suitable recess media with an index of refraction lower than the light-transmitting medium 94 include, but are not limited to, air, epoxies, silicon dioxide, and silicon nitride. Suitable recess media with an index of refraction lower than the light-transmitting medium 94 that can also serve as cladding include, but are not limited to, silicon dioxide, and silicon nitride.

Figure 2E:
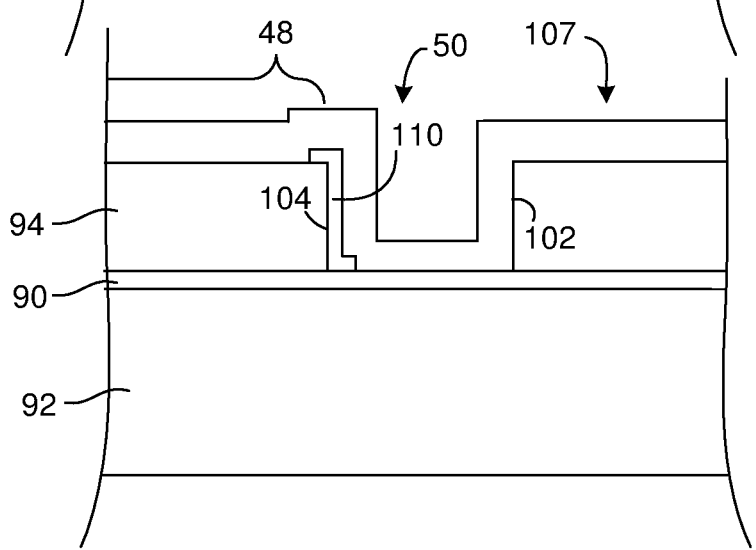

In some instances, the recess medium 106 is a medium that causes the outgoing LIDAR signal or input signal to be reflected at the return surface 104. For instance, the recess medium 106 can include a reflective material 110 that contacts the return surface 104. FIG. 2E illustrates a layer of reflective material 110 in contact with the return surface 104. Although FIG. 2E illustrates a cladding positioned on the output component such that the cladding is located over the recess medium 106 and extends into the recess 102, the cladding is optional. Suitable reflective materials 110 include, but are not limited to, multi-layer dielectric films including silicon dioxide, hafnium oxide and aluminum oxide, and metals such as aluminum, nickel, and gold.

Suitable claddings include, but are not limited to, silicon dioxide, silicon nitride, and aluminum oxide.

Figure 2F:
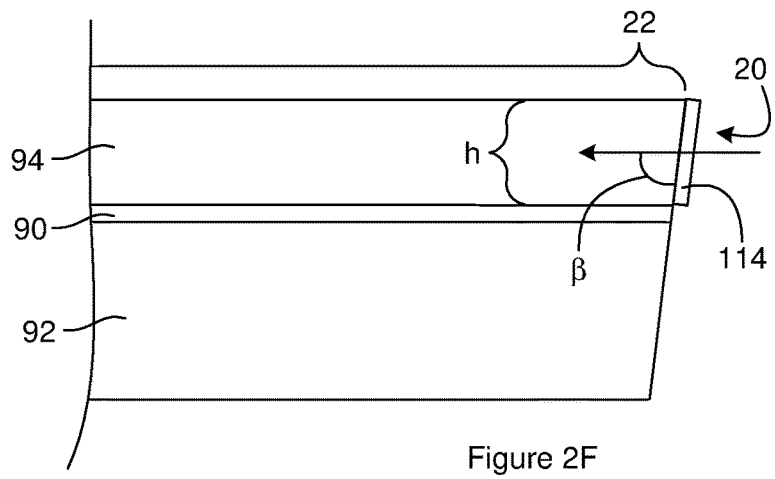

FIG. 2F illustrates the interface between the free space region 22 and the environment in which the LIDAR chip is positioned. For instance, FIG. 2F can be a cross section of the LIDAR chip of FIG. 1A taken at the line labeled F. A portion of the free space region 22 terminates at the facet 20 through which the LIDAR input signal enters the light-transmitting medium 94 to serves as the serve as a comparative light signal. The facet 20 can be at an angle ß measured in a direction that is perpendicular to a plane of the LIDAR chip and relative to a direction of propagation of the comparative light signal in the free space region 22. The plane of the LIDAR chip can be an upper surface of a substrate such as the substrate 92 of FIG. 2A through FIG. 2C. The angle β can be less than 90° in order to reduce the effects of back reflection on the LIDAR output signal(s). Suitable values for the angle ß include angles less than or equal to 84°, 85° or 90° and/or greater than or equal to 78°, 80°, or 82°.

The facet 20 can optionally include an anti-reflective coating 114. Suitable anti-reflective coatings 114 include, but are not limited to, single layer dielectric coatings such as silicon nitride, multi-layer dielectric coatings including silica, hafnium oxide, and aluminum oxide. Although the facet construction of FIG. 2F is disclosed in the context of a facet on the free space region, the utility waveguide 12 can terminate at a facet constructed as disclosed in the context of FIG. 2F.

The height of the free space region is labeled h in FIG. 2F. In some instances, the free space region(s) have the same height or substantially the same height as the ridge of the waveguide. As a result, the top of free space region(s) can be continuous with the tops of the waveguides. Accordingly, the height of the free space region (h in FIG. 2F) can be the same as the height labeled h in FIG. 2B. Accordingly, in some instances, the height of the free space region 22 is greater than 1 µm and less than 4 µm.

Figure 2G:
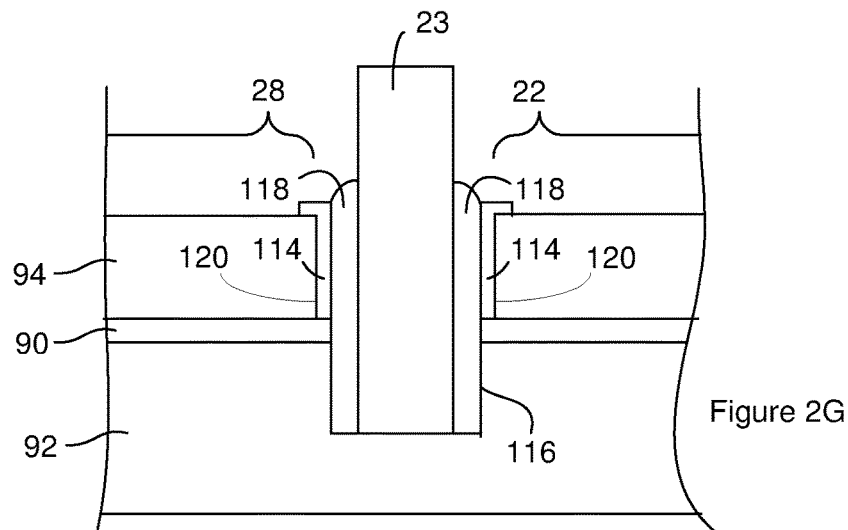

FIG. 2G is a cross-section illustrating a suitable interface between the free space region 22, the beam divider 23, and the second free space region 28. For instance FIG. 2G can be a cross section of the LIDAR chip of FIG. 1A taken along the line labeled G in FIG. 1A. A recess 116 extends through the light-transmitting medium 94. The recess 116 can extend through the buried layer 90 and into the substrate 92. The beam divider 23 is received in the recess 116. The beam divider 23 can be positioned in the recess 116 such that a bottom of the beam divider 23 is at or below the bottom of the light-transmitting medium 94.

An adhesive 118 can be positioned so as to immobilize the beam divider 23 in the recess 116. The adhesive can be transparent or substantially transparent. Suitable adhesives include, but are not limited to, epoxies.

An anti-reflective coating 114 can optionally be positioned on a facet 120 of the free space region 22 and/or on a facet 120 of the second free space region 28. In some instances, the anti-reflective coating 114 is between a facet 120 and the beam divider 23 and/or between a facet 120 and an adhesive 118.

Figure 2H:
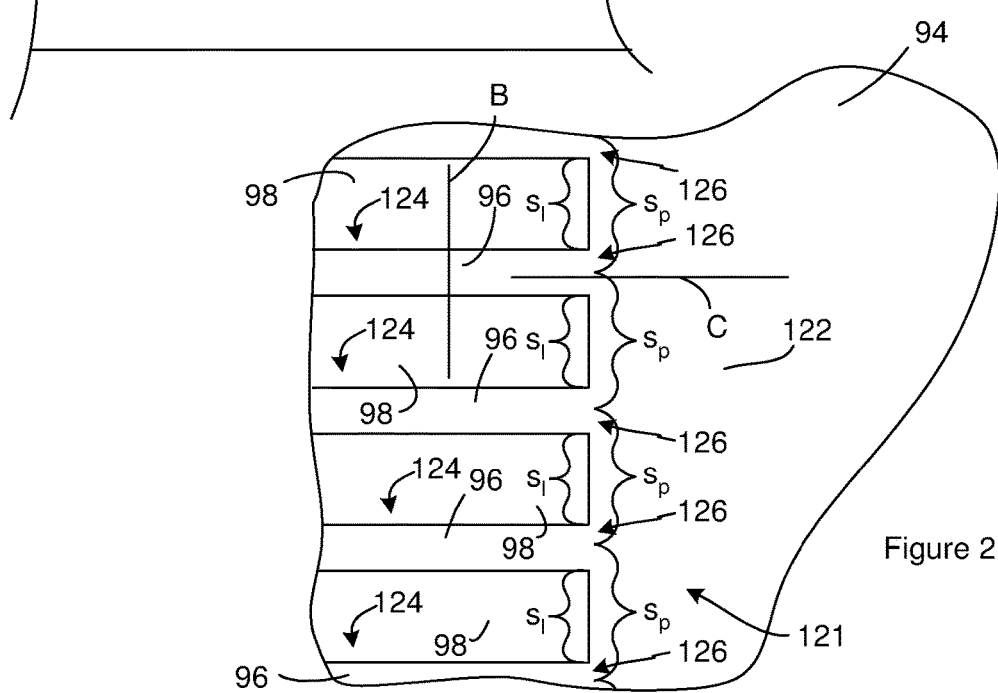

The first array waveguides 30 and/or the second array waveguides 40 can be constructed as disclosed in FIG. 1A. For instance, FIG. 2H is a topview of an interface between an entry side of a waveguide array 121 and a free space region 122. The configuration illustrated in FIG. 2H can be used for an interface of the first waveguide array 24 and the free space region 22 and/or the second waveguide array 26 and the second free space region 28. FIG. 2C can represent a cross section of the interface shown in FIG. 2H taken along the line labeled C where the third free space region 48 shown in FIG. 2C can represent the free space region 122.

The waveguide array 121 includes array waveguides 124 that each terminates at an entry port 126. FIG. 2B can represent a cross section of the array waveguides 124 taken along the line labeled B in FIG. 2H. Light from the comparative signal and/or the reference signal can enter all of portion of the array waveguides 124 from the free space region 122. The light from the free space region 122 enter the array waveguides 124 through the associated entry port.

The entry ports 126 in a waveguide array 121 can be in a straight or curved arrangement. For instance, a curve fit to the centroids of all or a portion of the entry ports 126 can be a straight, arced, or curved line. In some instances, the entry ports 126 are arranged such that a curve fit to the centroids of all or a portion of the entry ports 126 is spherical, parabolic, or hyperbolic.

The distance between the centers of the entry ports 126 is labeled $s_p$ in FIG. 2H. The distance between the lateral sides of adjacent array waveguides 124 is labeled $s_p$ in FIG. 2H. The distances labeled $s_p$ and $s_l$ can be selected such that movement of the comparative signal across the entry ports does not result in substantial loss of the comparative signal as a result of the comparative signal being incident on the waveguide array 121 at a location that is between entry ports. A suitable distance between the centers of the entry ports 126 ($s_p$) includes distances greater than 1, 1.5, or 2 µm and/or less than 3, 4, or 5 µm. A suitable distance between the lateral sides of adjacent array waveguides ($s_l$) includes distances greater than 0.2, 0.4, or 0.6 µm and/or less than 0.8, 1.0, or 1.2 µm.

As shown in FIG. 1A, the array waveguides 124 can separate as they move away from the free space region and toward the light sensors (32 and 42 in FIG. 1A). For instance, the distance between the centers of the array waveguides and the distance between the lateral sides of adjacent array waveguides can increases as the array waveguides move away from the free space region and toward the light sensors. The increase in separation can be sufficient to allow the light sensors to be positioned adjacent to one another. Other light sensor arrangements are possible. For instance, the light sensors can be staggered in multiple rows or columns rather than arranged in a single row or column. This staggering can reduce the amount of separation needed between the light sensors and accordingly between the array waveguides at the light sensors.

The above LIDAR chip construction is suitable for use with various signal-shaping components and steering mechanisms. Examples of suitable steering mechanisms include, but are not limited to, actuated optical gratings, mirrors such as mechanically driven mirrors and Micro Electro Mechanical System (MEMS) mirrors, voice coil mirrors, piezoelectrically driven mirrors, and optical phased arrays. Examples of suitable signal-shaping components include, but are not limited to, collimating devices, lenses, and mirrors.

Figure 3A:
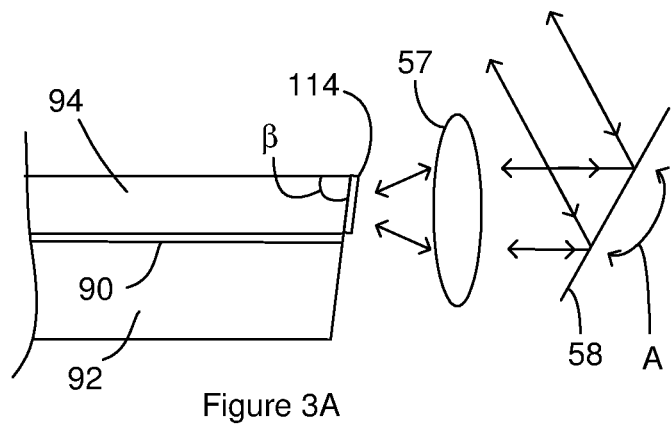
FIG. 3A is a cross section of a portion of a LIDAR system showing an example of an interface between a LIDAR chip, a steering mechanism, and a signal-shaping component.

FIG. 3A is a cross section of a portion of a LIDAR system showing an example of an interface between a LIDAR chip constructed on a silicon-on-insulator platform, a steering mechanism 58 and a first signal-shaping component 57. A lens serves as the first signal-shaping component 57 and can provide collimate or focus the shaped output signal output from the first signal-shaping component 57. A mirror serves as a steering mechanism 58 that receives the shaped output signal and outputs the system output signal in the desired direction. As is illustrated by the arrow labeled A, the electronics can move the mirror so as to steer the collimated or focused system output signal(s) and/or scan the collimated or focused system output signal(s). The movement of the mirror can be in two dimensions or three dimensions. Suitable mirrors include, but are not limited to, mechanically driven mirrors and Micro Electro Mechanical System (MEMS) mirrors.

Figure 3B:
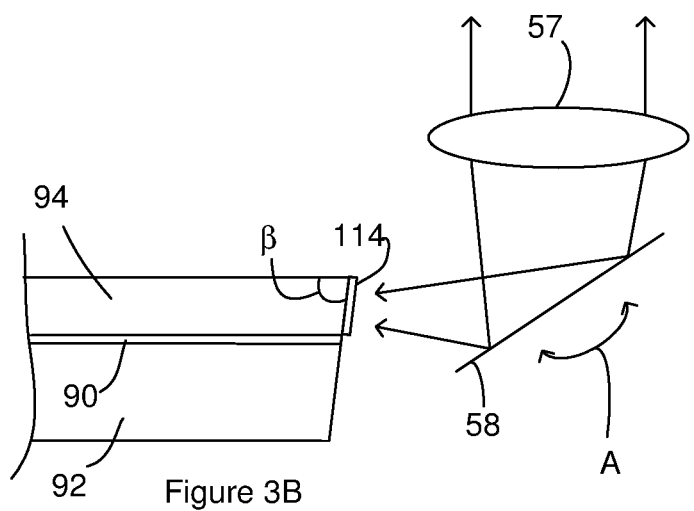
FIG. 3B is a cross section of a portion of a LIDAR system showing an example of an interface between a LIDAR chip, a steering mechanism, and a signal-shaping component.

Although FIG. 3A illustrates one or more signal-shaping components between the LIDAR chip and one or more steering mechanisms, the LIDAR system can include one or more steering mechanisms between the LIDAR chip and one or more signal-shaping components. For instance FIG. 3B illustrates the beam steering mechanism 58 between the LIDAR chip and the first signal-shaping component 57.

Figure 4A:
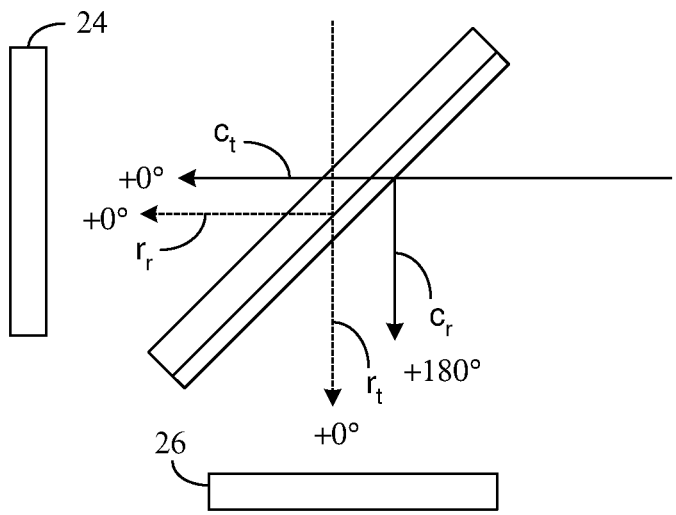
FIG. 4A illustrates a beam divider configured to increase a phase of a portion of the comparative signal (labeled $r_c$) relative to the phase of another portion of the comparative signal (labeled $t_c$).
Figure 4B:
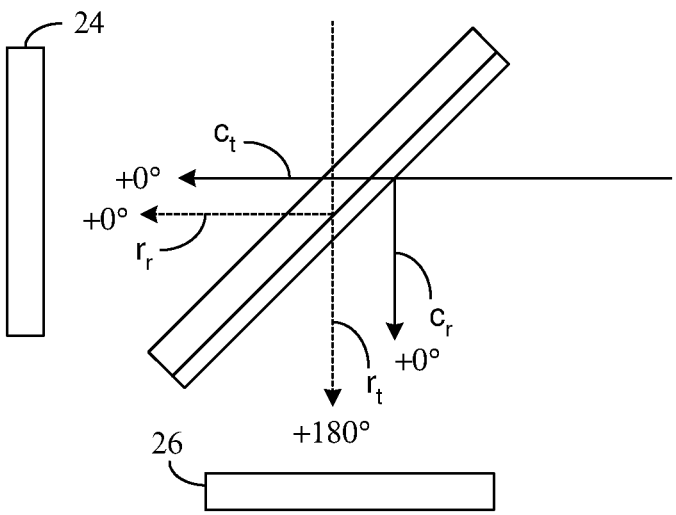
FIG. 4B illustrates a beam divider configured to increase the phase of a portion of a reference signal (labeled $t_r$) relative to the phase of another portion of the reference signal (labeled $r_r$).

In some instances, the beam divider 23 splits the comparative signal and the reference signal such that the first portion of the comparative signal and the second portion of the comparative signal are phase shifted relative to each other by 180° but the first portion of the reference signal is not phase shifted relative to the second portion of the reference signal. For instance, FIG. 4A illustrates the beam divider 23 configured to increase the phase of the second portion of the comparative signal (labeled $c_r$) relative to the phase of the first portion of the comparative signal (labeled $c_t$). In some instances, the beam divider 23 splits the comparative signal and the reference signal such that the first portion of the reference signal and the second portion of the reference signal are phase shifted relative to each other by 180° but the first portion of the comparative signal is not phase shifted relative to the second portion of the comparative signal. For instance, FIG. 4B illustrates the beam divider 23 configured to increase the phase of the second portion of the reference signal (labeled $r_t$) relative to the phase of the first portion of the reference signal (labeled $r_r$).

Although the LIDAR chip is disclosed as operating on light signals that can travel through multiple free space regions; however, the LIDAR chip can be constructed without free space regions or have as few as a single free space region through which light signals travel. For instance, the beam divider can be a different optical component. When the optical component that replaces the beam divider does not transmit the comparative light signal, light signals need not travel through the second free space region shown in FIG. 1A. As a result, the LIDAR chip can operate on light signals that travel through one or more space regions.

Figure 5A:
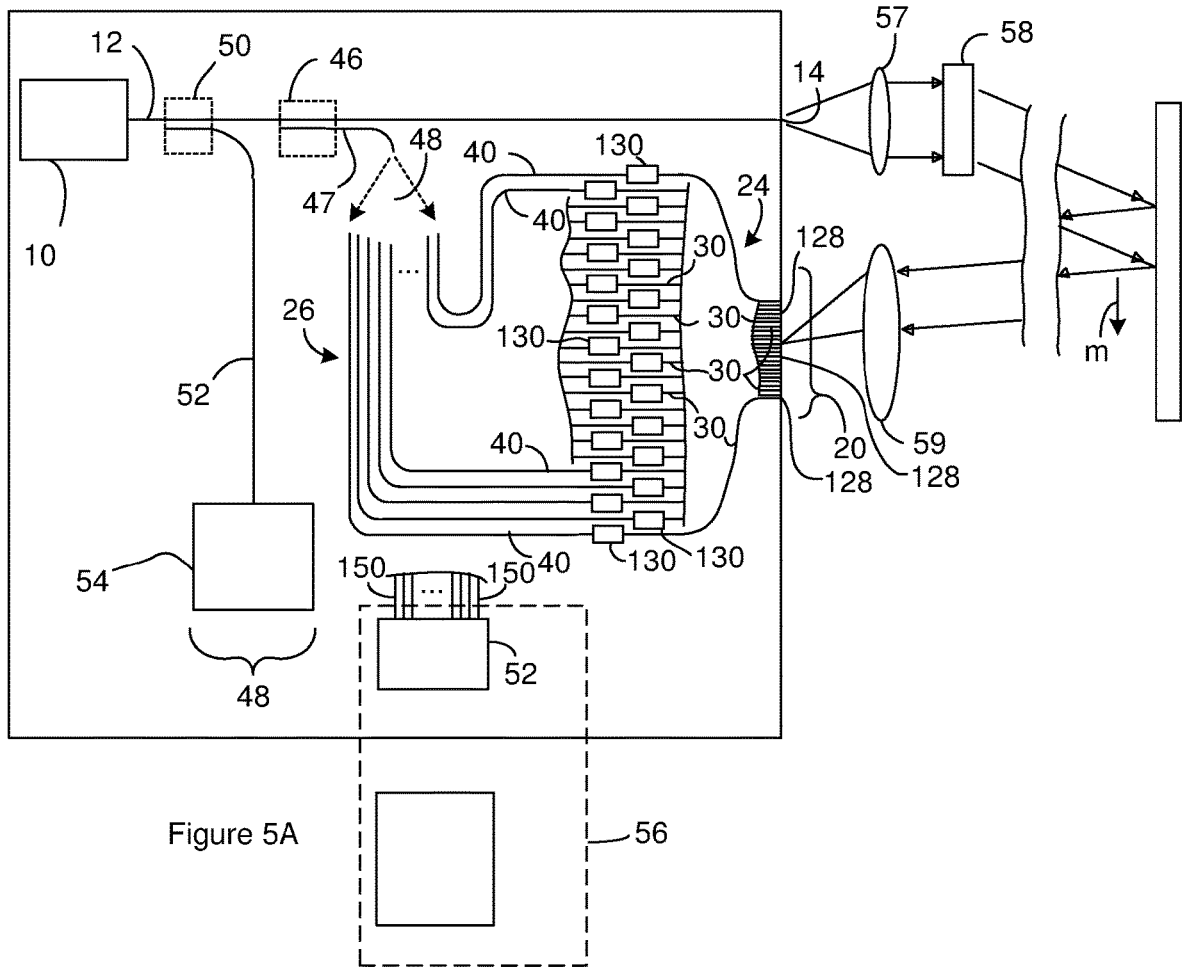
FIG. 5A illustrates a LIDAR system with a LIDAR chip having a waveguide array that terminates at a lateral side of the LIDAR chip.

The LIDAR chip can be constructed with a waveguide array that terminates at a lateral side of the LIDAR chip. For instance, FIG. 5A illustrates a LIDAR system having a LIDAR chip constructed with the first array waveguides 30 in the first waveguide array 24 terminating at a lateral side of the LIDAR chip. Each of the first array waveguides 30 can terminate at a facet 128.

The second signal-shaping component 59 can be configured to focus the LIDAR input signal such that the LIDAR input signal is focused at or near a location along the entry side of the first waveguide array 24. For instance, the second signal-shaping component 59 can be configured to focus the LIDAR input signal at or near the facets 128 of the first array waveguides 30.

Light from the LIDAR input signal can enter the LIDAR chip through the facet 128 of one or more of the first array waveguides 30. The portion of the LIDAR input signal that enters a first array waveguide 30 serves as a comparative portion. Each of the first array waveguides 30 is configured to carry the comparative portion received by that first array waveguide 30 to a composite signal generator 130.

The reference waveguide 47 carries the reference light signal to the third free space region 48. The reference light signal can travel through the third free space region 48 to the second waveguide array 26. The second array waveguides 40 in the second waveguide array 26 are arranged to receive the reference light signal from the third free space region 48. The second array waveguides 40, the third free space region 48 and the reference waveguide 47 can be configured such that the reference light signal is distributed among the second array waveguides 40. For instance, the second array waveguides 40, the third free space region 48 and the reference waveguide 47 can be arranged such that the third free space region 48 operates as part of a star coupler. In some instances, each of the second array waveguides 40 receives a portion of the reference signal.

Figure 5B:
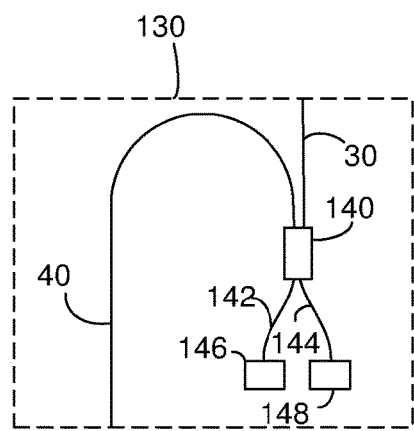
FIG. 5B is a schematic of a composite signal generator that is suitable for use in a LIDAR chip constructed according to FIG. 5A.

The portion of the reference signal that is received by a second array waveguide 40 serves as a reference portion. Each of the second array waveguides 40 can carry one of the reference portions to one of the composite signal generators 130. FIG. 5B illustrates an example of a composite signal generator 130 that is suitable for use as any, all, or each of the composite signal generators 130 in the LIDAR chip of FIG. 5A. In the illustrated composite signal generator 130, a second array waveguide 40 carries one of the reference portions to a light-combining component 140 and a first array waveguide 30 carries one of the comparative portions to the light-combining component 140.

The light-combining component 140 combines the comparative portion and the reference portion into a composite signal. Due to the difference in frequencies between the comparative portion and the reference portion, the composite signal is beating between the comparative portion and the reference portion.

The light-combining component 140 also splits the composite signal onto a first detector waveguide 142 and a second detector waveguide 144. The first detector waveguide 142 carries a first portion of the composite signal to a first light sensor 146 that converts the first portion of the composite signal to a first electrical signal. The second detector waveguide 144 carries a second portion of the composite signal to a second light sensor 148 that converts the second portion of the composite signal to a second electrical signal. Examples of suitable light sensors include germanium photodiodes (PDs), and avalanche photodiodes (APDs).

In some instances, the light-combining component 140 splits the composite signal such that the portion of the comparative signal included in the first portion of the composite signal is phase shifted by 180° relative to the portion of the comparative signal in the second portion of the composite signal but the portion of the reference signal in the first portion of the composite signal is not phase shifted relative to the portion of the reference signal in the second portion of the composite signal. Alternately, the light-combining component 140 splits the composite signal such that the portion of the reference signal in the first portion of the composite signal is phase shifted by 180° relative to the portion of the reference signal in the second portion of the composite signal but the portion of the comparative signal in the first portion of the composite signal is not phase shifted relative to the portion of the comparative signal in the second portion of the composite signal. Accordingly, the light-combining component 140 can provide the phase shifting functionality provided by the beam divider 23 illustrated in FIG. 4A or FIG. 4B.

Figure 5C:
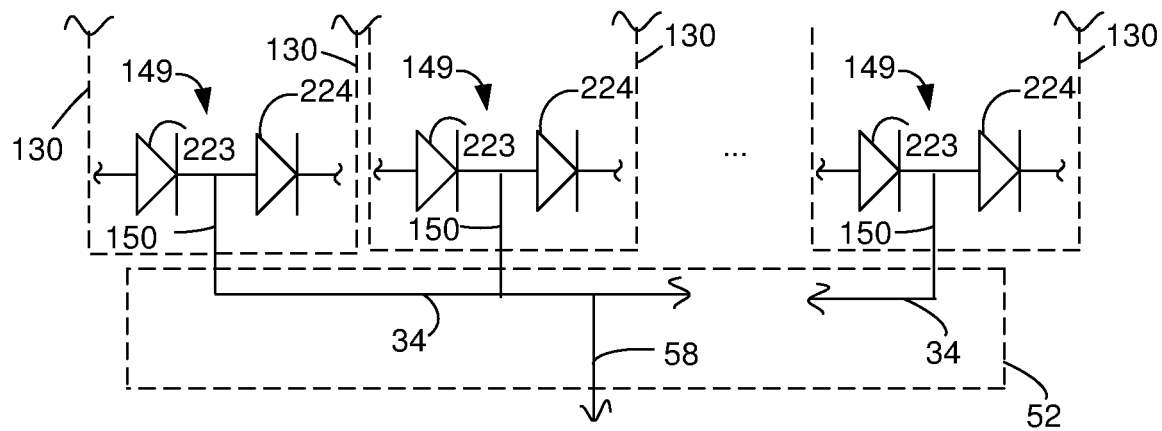
FIG. 5C illustrates a processing unit 52 that is suitable for use in a LIDAR chip constructed according to FIG. 5A.

The electronics 52 and/or the composite signal generator 130 can connect the first light sensor 146 and the second light sensor 146 in each of the composite signal generators 130 as a balanced detector 149. For instance, the first light sensor 146 and the second light sensor 148 in each composite signal generator 130 can be connected in series as shown in FIG. 5C. The serial connection in each of the balanced detectors is in communication with a data line 150 that carries the output from the balanced detector as a data signal.

The data lines 150 can be connected in parallel by the first parallel line 34 as shown in FIG. 5C. Accordingly, the data signals output by the balanced detectors in different composite signal generators 130 are added or combined to form the composite signal carried on the first parallel line 34. Since the data signals include a contribution from one or more comparative portion and one or more reference portions, the composite signal includes a contribution from one or more comparative portions and one or more reference portions. The composite signal is beating at a beat frequency due to the difference in the frequencies of the contributions of the comparative light signal and the reference signal to the composite light signal. The data signal can be carried on a sensor output line 54 and can serve as an electrical representation of the composite signals.

The electronics 56 include a transform mechanism 60 that receives the data signal from the sensor output line 54 as disclosed in the context of FIG. 1B. The electronics can also include the LIDAR data generator 66 disclosed in the context of FIG. 1B. The electronics can provide the LIDAR output signal with the frequency pattern of FIG. 1C and operate the transform mechanism 60 and the LIDAR data generator 66 as disclosed in the context of FIG. 1B and FIG. 1C to generate the LIDAR data.

As shown in FIG. 5A, a portion of the first array waveguide(s) 30 receive the LIDAR input signal. As a result, a portion of the first array waveguide(s) 30 each carries a comparative portion. The location where the waveguide array 24 receives light from the LIDAR input signal changes in response to the steering of the system output signal. As a result, the selection of first array waveguide(s) 30 carries a comparative portion can change in response to the steering of the system output signal. However, the change in a location where the comparative signal enters the waveguide array does not result in substantial loss of the comparative portions because it merely changes the first array waveguide (s) 30 that receive comparative portions.

Figure 6A:
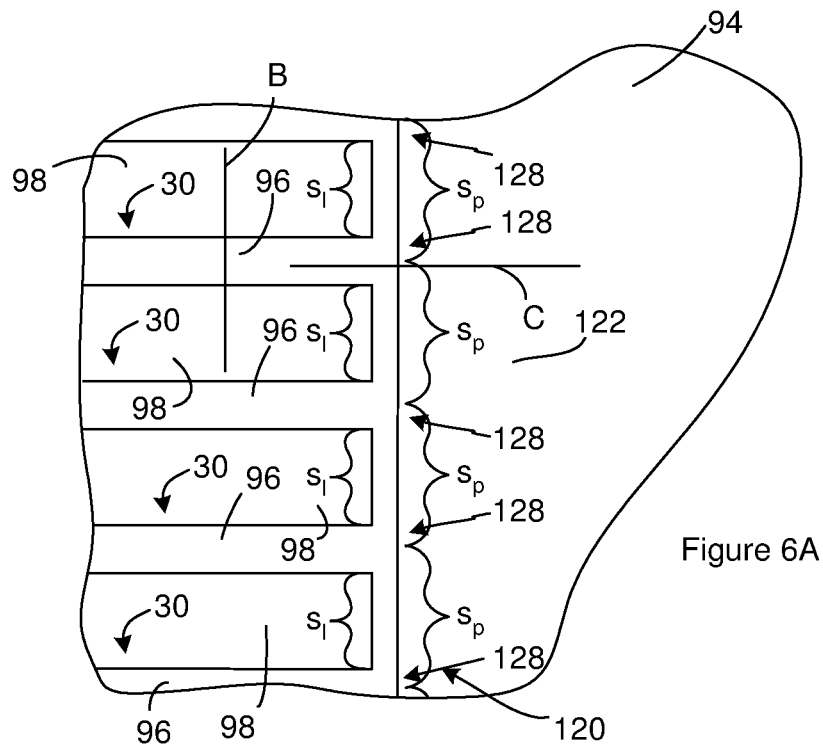
FIG. 6A is a topview of a portion of a LIDAR chip where multiple array waveguides terminate at a lateral side of the LIDAR chip.
Figure 6B:
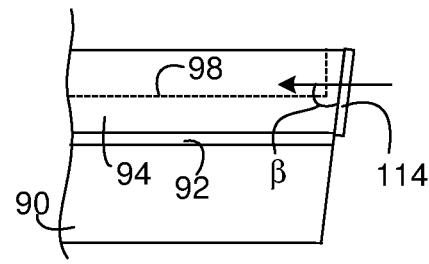
FIG. 6B can represent a cross section of the portion of the LIDAR chip shown in FIG. 6A taken along the line labeled C in FIG. 6A

The LIDAR chip of FIG. 5A can be constructed on platforms such as a silicon-on-insulator wafer. FIG. 6A is a topview of a portion of the LIDAR chip where multiple first array waveguide(s) 30 terminate at a lateral side of the LIDAR chip. FIG. 6B can represent a cross section of the portion of the LIDAR chip shown in FIG. 6A taken along the line labeled C in FIG. 6A. FIG. 2B can represent a cross section of the portion of the LIDAR chip shown in FIG. 6A taken along the line labeled B in FIG. 6A. The facets 128 of adjacent first array waveguides 30 can be continuous as shown in FIG. 6A but can be spaced apart and/or non-continuous.

In FIG. 6A, the distance between the centers of the facets 128 is labeled $s_p$ in FIG. 5B. The distance between the lateral sides of adjacent first array waveguide(s) 30 at or near the facets 128 is labeled $s_l$ in FIG. 5B. The distances labeled $s_p$ and $s_l$ can be selected such that movement of the LIDAR input signal across the facets of the first array waveguide(s) 30 does not result in substantial loss of the comparative portions. A suitable distance between the centers of the facets 128 ($s_p$) includes distances greater than 1, 1.5, or 2 µm and/or less than 3, 4, or 5 µm. A suitable distance between the lateral sides of adjacent first array waveguide(s) 30 at or near the facets 128 includes distances greater than 0.2, 0.4, or 0.6 µm and/or less than 0.8, 1.0, or 1.2 µm.

As shown in FIG. 6A, the array waveguides 124 can separate as they move away from the facets 128. For instance, the distance between the centers of the array waveguides and the distance between the lateral sides of adjacent array waveguides can increases as the array waveguides move away facets 128 and toward the composite signal generators 130. The increase in separation can be sufficient to allow the composite signal generator 130 to be positioned adjacent to one another and/or to be staggered as shown in FIG. 5A.

In FIG. 6A, the interface between the third free space region 48 and the multiple second array waveguides 40 can be constructed at disclosed in the context of FIG. 2H. Although FIG. 6A illustrates the third free space region 48 configured as a star coupler, other signal distribution components can be used to distribute the reference signal across multiple second array waveguides 40. For instance, cascaded y-junctions can serve as a distribution component for distributing a reference signal across multiple array waveguides 40. Other suitable distribution components include, but are not limited to, cascaded multimode interference devices (MMIs).

The light sensors are illustrated as photodiodes in FIG. 2B and FIG. 5C, other light sensors are suitable. Suitable light sensors include photodiodes and other types of light sensors that can be bonded to the LIDAR chip rather than integrated with the LIDAR chip. In some instances, all or a portion of the light sensors are integrated with the LIDAR chip. For instance, the light sensors can be in-line light sensors that are each integrated with one of the array waveguides.

Figure 7:
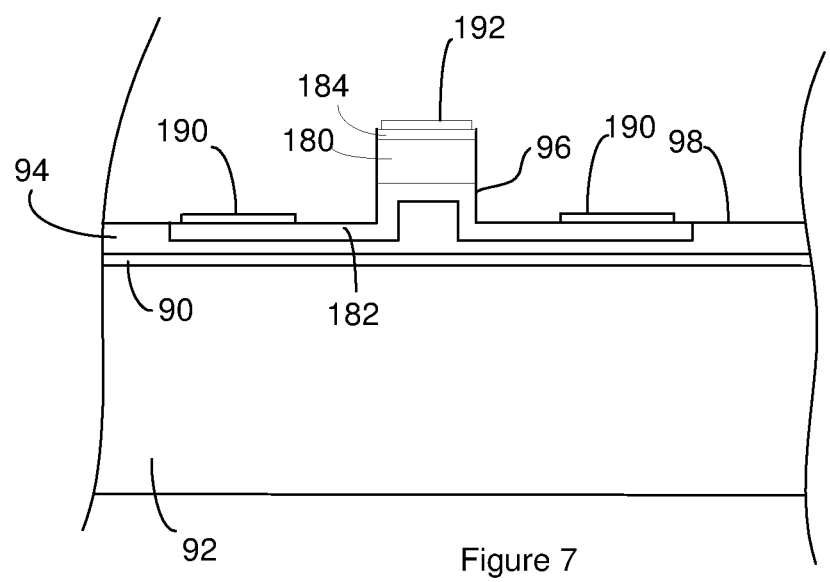
FIG. 7 is a cross section of an in-line light sensor that is suitable for use in a LIDAR chip.

FIG. 7 provides a cross section of an in-line light sensor that is suitable for use in the above LIDAR chips. The light sensor is illustrated on a silicon-on-insulator (SOI) platform although the light sensor can be constructed on other platforms. The light sensor is integrated with a waveguide having a structure as disclosed in FIG. 2B.

The light sensor includes a light-absorbing medium 180 positioned to receive light from the waveguide. For instance, a light-absorbing medium 180 can be located on top of the ridge 96 of the light-transmitting medium 94. As a result, a portion of the light signal traveling through the waveguide enters the light-absorbing medium 180. For instance, the light-absorbing medium 180 can be configured such that the fundamental mode is coupled upward into the light-absorbing medium 180 from the light-transmitting medium 94. For instance, the index of refraction of the light-absorbing medium 180 can be higher than the index of refraction of the light-transmitting medium 94.

The light-transmitting medium 94 includes a first doped region 182 positioned in a portion of the light-transmitting medium 94 located between the light-absorbing medium 180 and the substrate 92. In some instances, the first doped region 182 contacts the light-absorbing medium 180. The light-absorbing medium 180 includes a second doped region 184. A portion of the light-absorbing medium 180 is located between the second doped 34 region and the first doped region 182.

When the first doped region 182 includes an n-type dopant, the second doped region 184 includes a p-type dopant and when the first doped region 182 includes a p-type dopant, the second doped region 184 includes an n-type dopant. Suitable dopants for N-type regions include, but are not limited to, phosphorus and/or arsenic. Suitable dopants for P-type regions include, but are not limited to, boron. A suitable concentration of carriers in the p-type region includes values greater than $1\times10^{14}/cm^3$, $1\times10^{16}/cm^3$, $1\times10^{17}/cm^3$, and/or less than $1\times10^{18}/cm^3$, $1\times10^{19}/cm^3$, $1\times10^{21}/cm^3$. A suitable value for the concentration of carriers in the n-type region includes values greater than $1\times10^{14}/cm^3$, $1\times10^{16}/cm^3$, $1\times10^{17}/cm^3$, and/or less than $1\times10^{18}/cm^3$, $1\times10^{19}/cm^3$, $1\times10^{21}/cm^3$.

The first doped region 182 is in contact with one or more first electrical conductors 190 such as a metal. The second doped region is in contact with one or more second electrical conductors 192 such as a metal. Electrical energy can be applied to the one or more first electrical conductor 190 and the one or more second electrical conductors 192 in a reverse bias so as to form an electrical field in the light-absorbing medium 180. When the electrical field is formed and the light-absorbing material absorbs a light signal, an electrical current flows through the light-absorbing material. As a result, the level of electrical current through the light-absorbing material indicates the intensity of light signals being received by the light-absorbing material.

A light-absorbing medium 180 that is suitable for detection of light signals used in LIDAR applications includes, but is not limited to, Ge.

In addition to the electronics 62 disclosed above, the electronics can include additional components including, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
 a LIDAR chip having a slab waveguide with a facet through which a LIDAR input signal enters the LIDAR chip from off the LIDAR chip, the slab waveguide configured to constrain expansion of the LIDAR input signal in a vertical direction but not in a lateral direction,
  the vertical direction and the lateral direction each being perpendicular to a direction of propagation of the LIDAR input signal and the horizontal direction being perpendicular to the vertical direction; and
 the LIDAR chip including an optical component that receives a comparative light signal and a reference light signal directly from the slab waveguide, the comparative light signal including light from the LIDAR input signal, and the reference light signal including light that has not exited from the LIDAR chip.

2. The LIDAR system of claim 1, wherein the LIDAR chip is configured to output a LIDAR output signal and the comparative light signal includes light from the LIDAR output signal after the LIDAR output signal has been reflected by an object located outside of the LIDAR system.

3. The LIDAR system of claim 1, wherein the optical component is a beam splitter.

4. The LIDAR system of claim 1, wherein the LIDAR chip is built on a silicon-on-insulator platform.

5. The LIDAR system of claim 1, wherein the vertical direction is perpendicular to a top of a substrate over which the slab waveguide is positioned.

6. The system of claim 1, wherein the LIDAR chip is configured to generate a composite signal that includes a contribution from the comparative light signal and contribution from the reference signal.

7. The LIDAR system of claim 1, wherein the optical component also receives a reference signal directly from the slab waveguide; and
 the LIDAR chip including array waveguides, each of the array waveguides configured to concurrently receives the reference signal, a first portion of the array waveguides configured to receive the comparative light signal while a second portion of the array waveguides do not receive the comparative light signal.

8. The LIDAR system of claim 7, wherein the first portion of the array waveguides that receive light from the comparative light signal changes in response to changes in an angle of incidence of the LIDAR input signal upon the facet.

9. The LIDAR system of claim 7, wherein the LIDAR chip is configured to generate a composite signal, the composite signal being an optical signal that includes a contribution from the comparative light signal and the reference signal.

10. The LIDAR system of claim 1, wherein the LIDAR chip includes a waveguide array that receives at least a portion of the comparative light signal from the optical component.

11. The LIDAR system of claim 10, wherein the LIDAR chip includes a second slab waveguide, and
 the portion of the comparative light signal received by the waveguide array travels an optical pathway from the optical component to the waveguide array, and
 the optical pathway passes through the second slab waveguide.

12. A LIDAR system, comprising:
 a LIDAR chip configured to generate a composite signal and having a slab waveguide with a facet through which a LIDAR input signal enters the LIDAR chip from off the LIDAR chip, having a contribution from a comparative signal and a reference signal,
  the comparative signal including light reflected by an object located outside of the LIDAR system,
  the reference signal including light that has not exited from the LIDAR chip, and
  the LIDAR chip including the slab waveguide through which the comparative signal and the reference signal travel, the slab waveguide being configured to constrain expansion of the LIDAR input signal in a vertical direction but not in a lateral direction,
   the vertical direction and the lateral direction each being perpendicular to a direction of propagation of the LIDAR input signal and the horizontal direction being perpendicular to the vertical direction.

13. The system of claim 12, wherein the LIDAR chip is constructed on a silicon-on-insulator platform.

14. The system of claim 12, wherein the vertical direction is perpendicular to a top of a substrate over which the slab waveguide is positioned.

15. The system of claim 12, wherein the LIDAR chip includes a waveguide array that includes multiple array waveguides that are each configured to concurrently receive the reference signal, a first portion of the multiple array waveguides being configured to receive the comparative signal while a second portion of the multiple array waveguides do not receive the comparative signal.

16. The system of claim 15, wherein the LIDAR chip includes a second waveguide array and a second slab waveguide, the second waveguide array receiving a second portion of the comparative signal and a second portion of the reference signal from the second slab waveguide.

17. The system of claim 16, wherein a beam splitter is located between the second slab waveguide and the slab waveguide.

18. The LIDAR system of claim 16, wherein the first portion of the array waveguides that receive light from the comparative signal changes in response to changes in an angle of incidence of the LIDAR input signal upon the facet.

* * * * *